Aug. 24, 1926.
W. BORCHERT
TAIL CHAFFER
Filed Nov. 26, 1924
1,597,341
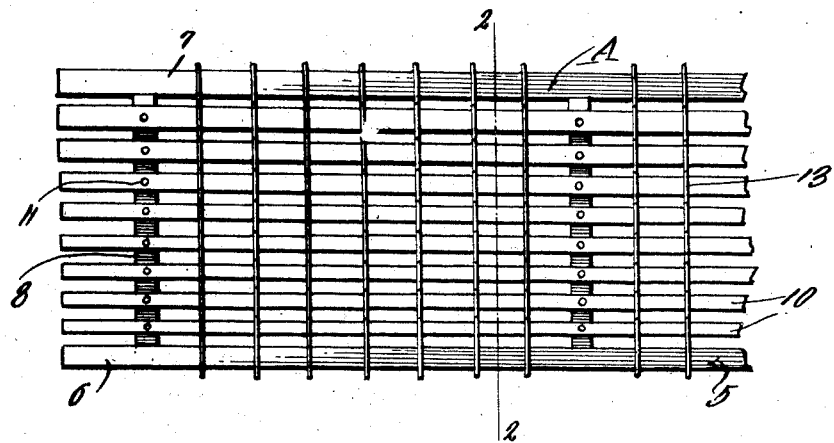
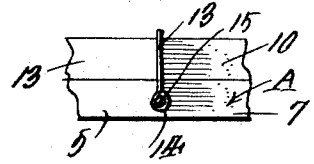
WITNESSES
Inventor
WILLIAM BORCHERT
By Richard B. Owen, Attorney Patented Aug. 24, 1926.

1,597,341

UNITED STATES PATENT OFFICE.

WILLIAM BORCHERT, OF FARIBAULT, MINNESOTA.

TAIL CHAFFER.

Application filed November 26, 1924. Serial No. 752,472.

This invention relates to threshing machines and more particularly to a novel tailing chaffer for a grain separator.

The primary object of the present invention is to provide an improved tailing chaffer, which will effectively catch all of the light grain which passes over the sieve with the chaff on the tailing chaffer, thereby eliminating the difficulty contingent with the use of the ordinary tailing chaffer.

Another object of the invention is the provision of an improved tailing chaffer which can be used with a comparatively light blast of air, the slats being so constructed and arranged relative to one another that the same will catch all of the light grain and permit the same to fall through to the elevator.

A further object of the invention is the provison of novel wires carried by the slats of the chaffer which will effectively carry over all of the coarse straw and prevent the straw from falling through the chaffer and back into the cylinder again with the light grain.

A still further object of the invention is to provide an improved tailing chaffer of the above character, which will be durable and efficient in use, one that will be simple and easy to manufacture and one which can be placed upon the market and incorporated with a standard threshing machine at a small cost.

With these and other objects in view, the invention consists in the novel construction, arrangement, and formation of parts, as will be hereinafter more specifically described, claimed and illustrated in the accompanying drawings, in which drawings:—

Figure 1 is a fragmentary view of the improved tailing chaffer.

Figure 2 is a transverse section through the same,

Figure 3 is an enlarged edge elevation of the same illustrating the means for connecting one of the cross wires in place.

Referring to the drawings in detail, wherein similar reference characters designate corresponding parts throughout the several views the letter A generally indicates the improved tailing chaffer, which comprises a frame 5 on which is supported the novel slats, which will be hereinafter more fully described.

The frame 5 can be constructed from any desired material and embodies a front supporting bar 6, a rear supporting bar 7, and transversely extending cross bars 8. The front and rear bars 6 and 7 and the cross bars 8 are all in the same plane with their upper faces flush in order that the slats, which will now be described, can be readily secured thereto.

The slats, indicated by the reference character 10, form an important part of the present invention and are bolted or otherwise secured to the cross bars as at 11. Each of the slats 10 is of a triangular shape in cross section and all have their lower faces disposed in a horizontal plane against said cross bars 8 and their upper faces inclined downwardly toward the front supporting bar 5. These inclined faces are indicated by the reference character 12 and form means for directing the grain down through the slats to the usual elevator employed for elevating the light grain back to the cylinder. The slats successively increase in size from the front supporting bar 6 to the rear supporting bar 7 and it is obvious that these slats will function to effectively catch the light grain and direct the same down to the elevator.

In accordance with this invention I also employ transversely extending wire rods 13 which extend across the slats 10 at spaced points as clearly shown in Figures 1 and 2. These wires 13 are bent to conform to the configuration of the slats and extend across the front and rear supporting bars 6 and 7 and have their terminals provided with depending eyes 14 which receive suitable fastening elements 15 that extend into said supporting bars. These cross wires 13 function as means for preventing any straw, which might be carried with the blast from falling through the slats and thus being elevated back with the light grain to the cylinder. These wires will effectively catch the straw and permit the straw to be blown off of the chaffer. The front bar 6 is placed facing the separator on the threshing machine with the slats 10 extending transversely thereof.

From the foregoing description, it can be seen that I have provided an improved tailing chaffer of exceptionally simple and durable construction, which will effectively catch all of the light grain and permit the thresher to be run with a lighter blast of air, Changes as to details may be made without departing from the spirit or the scope of this invention, but:—

What I claim as new is:—

1. In a tailing chaffer, a plurality of equi-distantly spaced slats and straw catching wires extending across said slats at equi-distantly spaced points and conforming to the configuration thereof.

2. A tailing chaffer comprising a frame including a front supporting bar, a rear supporting bar and a plurality of connecting cross bars, all of the cross bars having their upper faces arranged in the same horizontal plane, a plurality of equi-distantly spaced slats secured to the cross bars, each of the slats being triangular shaped in cross section and including an inclined upper face extending downwardly toward the front of the frame, the slats successively increasing in size towards the rear of the frame, and transversely extending straw receiving wires extending across the slats at spaced points and connected to the front and rear cross bars of the frame.

In testimony whereof I affix my signature.

WILLIAM BORCHERT.